(12) United States Patent
Gesenhues et al.

(10) Patent No.: US 7,807,605 B2
(45) Date of Patent: Oct. 5, 2010

(54) PROCESS FOR THE PREPARATION OF A TIO₂-CONTAINING CATALYST OR CATALYST SUPPORT WHICH IS STABLE TO HIGH TEMPERATURES

(75) Inventors: Ulrich Gesenhues, Moers (DE); Sonja Weyand, Duisburg (DE)

(73) Assignee: Sachtleben Chemie GmbH, Duisburg (DE)

( * ) Notice: Subject to any disclaimer, the term of this patent is extended or adjusted under 35 U.S.C. 154(b) by 791 days.

(21) Appl. No.: 10/981,388

(22) Filed: Nov. 3, 2004

(65) Prior Publication Data

US 2005/0164880 A1 Jul. 28, 2005

(30) Foreign Application Priority Data

Nov. 12, 2003 (DE) .............................. 103 52 816

(51) Int. Cl.
- B01J 23/00 (2006.01)
- B01J 21/00 (2006.01)
- B01J 23/08 (2006.01)

(52) U.S. Cl. .................. 502/350; 502/239; 502/242; 502/351; 502/355

(58) Field of Classification Search ............... 502/74, 502/211, 236, 239, 350, 232–234, 351, 355, 502/242; 423/239.1, 326, 335–340, 610

See application file for complete search history.

(56) References Cited

U.S. PATENT DOCUMENTS

| 3,887,494 | A | * | 6/1975 | Dietz | 502/236 |
|---|---|---|---|---|---|
| 4,085,193 | A | | 4/1978 | Nakajima et al. | |
| 4,388,222 | A | * | 6/1983 | Wilson et al. | 502/211 |
| 4,711,869 | A | * | 12/1987 | Cullo et al. | 502/239 |
| 4,929,586 | A | * | 5/1990 | Hegedus et al. | 502/217 |
| 4,954,476 | A | * | 9/1990 | Hums | 502/350 |
| 4,975,256 | A | * | 12/1990 | Hegedus et al. | 423/239.1 |
| 5,336,651 | A | * | 8/1994 | Yoshimoto et al. | 502/74 |
| 5,587,349 | A | * | 12/1996 | Abe et al. | 502/236 |
| 5,922,294 | A | | 7/1999 | Chattha et al. | |
| 6,036,847 | A | * | 3/2000 | Ziebarth et al. | 208/113 |
| 6,632,771 | B1 | * | 10/2003 | Maekawa et al. | 502/239 |
| 6,956,006 | B1 | * | 10/2005 | Mirsky et al. | 502/236 |
| 2003/0092858 | A1 | * | 5/2003 | Pecoraro et al. | 526/129 |
| 2003/0103889 | A1 | * | 6/2003 | Mirsky et al. | 423/326 |
| 2007/0060472 | A1 | * | 3/2007 | Fisher et al. | 502/232 |

FOREIGN PATENT DOCUMENTS

| DE | 24 58 888 A1 | 6/1975 |
|---|---|---|
| EP | 0339640 A1 * | 2/1989 |
| EP | 0 826 410 A2 | 3/1998 |
| EP | 0 826 410 B1 | 3/1998 |
| EP | 1063002 A2 * | 12/2000 |

OTHER PUBLICATIONS

Ho et al. "Mesoporous silica spheres from colloids," Journal of Colloid and Interface Science 308 (2007) 374-380.*
Alemany et al. "Photodegradation of phenol in water using silica-supported titania catalysts", Applied Catalysis B: Enviornmental 13 (1997) 289-297.*
Hsu et al. "Paper Whiteners I. Titania Coated Silica", Journal of Colloid and Interface Science 156, 56-65 (1993).*
Kim et al. "Synthesis and characterization of titania-coated silica fine particles bye semi-batch process", Colloids and Surfaces A: Phisicochem. Eng. Aspects 224 (2003) 199-126. Published online Jul. 26, 2003.*
Gao et al. "Titania-silica as catalysts: molecular structural characteristics and physico-chemical properties", Catalysis Today 51 (1999) 233-254.*
Castillo et al. "Influence of Preparation Methods on the Texture and Structure of Titania supported on Silica", Journal of Materials Chemistry, 1994, 4(6), 903-906.*
Hanprasopwattana et al. "Titania Coatings on Monodisperse Silica Spheres (Characterization Using 2-Propanol Dehydration and TEM)", Langmuir 1996, 12, 3173-3179.*

* cited by examiner

*Primary Examiner*—Stanley Silverman
*Assistant Examiner*—Anthony J Zimmer
(74) *Attorney, Agent, or Firm*—Fulbright & Jaworski L.L.

(57) ABSTRACT

A process for the preparation of a TiO₂-containing catalyst or catalyst support which is stable to high temperatures is described. In this process
- an aqueous Ti-containing solution having a concentration of dissolved Ti equivalent to 10 to 250 g TiO₂ per liter of solution is added to a suspension of not more than 10 wt. % strength of a finely disperse inorganic support material in water,
- the inorganic support material having a specific surface area, measured by the BET method, of >20 m²/g and any primary particle agglomerates present having a particle size of $d_{50}$<10 μm, preferably <5 μm,
- the rate of addition of the Ti-containing solution to the suspension being chosen such that an addition equivalent to 0.05 g TiO₂ per m² of support surface and hour is not exceeded,
- the TiO₂ is precipitated on the inorganic support and the product obtained is filtered, washed and calcined.

Alternatively, the TiO₂-containing catalysts or catalyst supports which are stable to high temperatures can be prepared by a process in which 1. hydrated precursors of one or more metal oxides or semi-metal oxides and 2. hydrated titanium oxide are rapidly precipitated from aqueous solution.

18 Claims, No Drawings

PROCESS FOR THE PREPARATION OF A TIO₂-CONTAINING CATALYST OR CATALYST SUPPORT WHICH IS STABLE TO HIGH TEMPERATURES

This application claims priority from German 103 52 816.4 filed Nov. 12, 2003, herein incorporated by reference in its entirety.

The invention relates to a process for the preparation of a $TiO_2$-containing catalyst or catalyst support which is stable to high temperatures and its use.

Gaseous harmful substances which can be formed during combustion processes, e.g. in automobiles or power stations, such as e.g. hydrocarbons, carbon monoxide (CO) and nitrogen oxides ($NO_x$), are rendered harmless with the aid of waste gas catalysts. Many such catalysts contain $TiO_2$, the $TiO_2$ acting as the catalyst itself or in interaction with transition metal oxides or noble metals as a co-catalyst.

The preparation of such catalysts is described e.g. in DE 2458888 A1. The heat resistance which extends to only 650° C. is a disadvantage of these catalysts. A catalyst described in U.S. Pat. No. 5,922,294, in which $TiO_2$ is present in the (and according to current expert opinion the only) active and therefore desired anatase modification, is indeed stable up to 800° C.; however, the preparation process of co-hydrolysis of alkoxides of titanium and aluminium (sol-gel process) has the disadvantage that organometallic compounds, which are not desired because they are relatively expensive, and organic solvents must be used. The process described in EP 0826410 for the system $TiO_2/SiO_2$ has similar characteristics.

The object of the invention is to overcome the disadvantages of the prior art, and in particular to provide a process for the preparation of a $TiO_2$-containing catalyst or catalyst support which leads to catalysts or catalyst supports with $TiO_2$ in the anatase form or an anatase/rutile mixed form, the catalyst material having a high surface area and being stable to high temperatures. Stable to high temperatures here means that the specific surface area and the original ratio of anatase to rutile modification in the $TiO_2$ content of the catalyst material are also retained at relatively high temperatures. The process should furthermore avoid the use of organometallic compounds and organic solvents and it should be possible to carry it out economically, that is to say with a high space/time yield.

The object is achieved by a process for the preparation of a $TiO_2$-containing catalyst or catalyst support which is stable to high temperatures. In this process, an aqueous titanium-containing solution having a concentration of dissolved Ti equivalent to 10 to 250 g $TiO_2$ per liter of solution is added to a suspension of not more than 10 wt. % strength of a finely disperse inorganic support material in water, $TiO_2$ being precipitated on the inorganic support as hydrated titanium oxide. Finely disperse here means that the inorganic support material has a specific surface area, measured by the BET method (DIN 66131 and 66132), of >20 m²/g and the primary particles either are not agglomerated, or any primary particle agglomerates present have a particle size of $d_{50}$<10 μm, preferably >5 μm (measured by laser diffraction). The rate of addition of the Ti-containing solution to the suspension is to be chosen here such that an addition of the equivalent of 0.05 g $TiO_2$ per m² of support surface and hour is not exceeded. The support material provided with $TiO_2$ is then filtered, washed and calcined. Depending on the support material employed, this can also be suspended in dilute or concentrated acids or alkalis instead of in water. By the possibility of choosing the pH, a further possibility of variation is available for the conditions of the subsequent precipitation of $TiO_2$. For example, for a support material of $SiO_2$ any desired pH below 9 can be chosen, and for $Al_2O_3$ any desired pH between 4 and 9. (Inorganic or organic) acids or alkalis which can be employed are e.g. HCl, $HNO_3$, $H_2SO_4$, acetic acid, oxalic acid, citric acid and NaOH, KOH or aqueous $NH_3$ solution. This may be advantageous e.g. in order to influence the degree of covering of the support particles with $TiO_2$, the roughness of the $TiO_2$ layer, the aggregation of the coated particles and the porosity of the aggregates.

Alternatively to the calcining, after filtration and washing the support material provided with $TiO_2$ (present as hydrated titanium oxide) can be introduced into a pressure container (autoclave) together with water and kept at temperatures of >100° C. for a period of one hour to several (e.g. 5) days. This process step is called hydrothermal treatment (cf. also Ullmanns Enzyklopädie der Technischen Chemie [Ullmanns Encyclopaedia of Industrial Chemistry], 4th edition, 1978, volume 15, p. 117 et seq.: K. Recker, Einkristallzüchtung [Growing Monocrystals]). A preferred period of time for the hydrothermal treatment of the support material provided with $TiO_2$ (present as hydrated titanium oxide) is 2 to 24 hours, particularly preferably 4 to 8 hours. The catalyst can then be dried in a known manner. It is also possible to carry out the hydrothermal treatment before the filtration and washing. This may be of economic advantage, depending on the filtration properties and the content of soluble residual salts.

It has been found, surprisingly, that a catalyst or catalyst support prepared in this manner has a sufficiently high specific surface area and comprises $TiO_2$ in the anatase form or in a fixed ratio of anatase and rutile, the specific surface area and the anatase form or the ratio of anatase to rutile being stable up to at least 800° C.

A titanyl sulfate solution or titanium sulfate solution stabilized with sulfuric acid is preferably employed as the aqueous Ti-containing solution.

The concentration of dissolved Ti in the Ti-containing solution is preferably equivalent to 10 to 200 g $TiO_2$ per liter of solution, particularly preferably 50 to 180 g. The concentration of the suspension of the finely disperse support material is preferably 0.2 to 8 wt. %, particularly preferably 0.5 to 5 wt. % and very particularly preferably 1 to 5 wt. %. In this context, higher concentrations increase the profitability of the process, but lead to a product quality which tends to be lower, and vice versa.

The finely disperse support material can preferably comprise one or more of the following substances or can be made of this: MgO, ZnO, $Al_2O_3$ pure and doped, $SiO_2$, naturally occurring and synthetically prepared silicates, alumosilicates, zeolites, $SnO_2$, $CeO_2$ pure and doped, $ZrO_2$ pure and doped, $Fe_2O_3$, NiO and CuO.

Alternatively, the object is achieved by a process for the preparation of a $TiO_2$-containing catalyst or catalyst support which is stable to high temperatures in which 1. hydrated precursors of one or more metal oxides or semi-metal oxides and 2. hydrated titanium oxide are rapidly precipitated out from aqueous solution.

Hydrated precursors here are to be understood as meaning those compounds which result formally by addition of one or more formula units of $H_2O$ to the formula unit of the metal oxide or semi-metal oxide. In this context, the hydrated precursors can also be non-stoichiometric, e.g. metatitanic acid corresponds only approximately to the formula $TiO(OH)_2$ (cf. U. Gesenhues, Chem. Eng. Technol. 24 (2001) 685). The corresponding oxide is formed from the hydrated precursors by calcining or hydrothermal treatment, water being split off.

"Rapidly precipitated out" is to be understood here as meaning that at least 30 g of solid, calculated as oxide (without water of hydration) are precipitated out per liter of suspension and hour. The maturing time after the precipitation is not included in the calculation here. The precipitation mixture obtained is then filtered, washed and calcined or subjected to a hydrothermal treatment.

For the precipitation, solutions of the salts of the metals or of the semi-metals and of Ti can be brought together simultaneously or successively in a stirred container. During this procedure, by simultaneous further addition of acid or alkali the pH is kept in those ranges which ensure precipitation. As a rule, the procedure is carried out with a pH of not more than 12, e.g. the pH must be below 9 for the precipitation of silica, above 2 for hydrated titanium oxide and between 5 and 8 for $Al(OH)_3$. It is also possible for solutions of the salts of metals or of semi-metals and of Ti to be initially introduced into the container and then adjusted to a particular suitable pH.

For the fine division of the precipitate and for the mixing of the two components in the end product—as with any precipitation reaction—the concentrations of the educts, their rate of addition, their stirring and mixing, the pH, the temperature and, where appropriate, carrying out the precipitation with a separate nucleation phase are of importance.

An advantage of the catalysts and catalyst supports prepared according to the invention is their stability to high temperatures. Even after calcining for 24 hours is at 800° C. (or 900° C.), the specific surface area falls by not more than 10 $m^2/g$ (not below 30 $m^2/g$), the porosity as a rule does not fall below a minimum value of 0.2 $cm^3/g$ and the anatase content in the $TiO_2$ decreases by not more than 10% points. The catalysts and catalyst supports prepared according to the invention preferably have, after calcining for 24 hours at 800° C., a specific surface area of at least 40 $m^2/g$, a porosity of at least 0.2 $cm^3/g$ and an anatase content in the $TiO_2$ of at least 90%. However, defined lower anatase contents can also be established, the particular anatase content established being heat-stable at 800° C. or changing by not more than 10 points after calcining for 24 hours at 800° C. The anatase content can be established during the preparation of the precursors of metal oxide or semi-metal oxide and of $TiO_2$ by the course of the precipitation (precipitation first of the support and then of the $TiO_2$ tends to lead to a higher rutile content, simultaneous precipitation of the support and of the $TiO_2$ tends to lead to a higher anatase content) or by the choice of a calcining temperature lying correspondingly above 800° C. (tends towards a higher rutile content) or optionally by doping e.g. with $SnO_2$ (tends towards a higher rutile content).

The catalysts prepared according to the invention can be doped with metal oxides, e.g. with $SnO_2$, $CeO_2$, $VO_x$, $CrO_x$, $MoO_x$, $WO_x$, $MnO_x$, $FeO_x$, and NiO. The known processes can be used for this, that is to say in the 1st process variant (precipitation of $TiO_2$ on a pre-produced finely disperse inorganic support)

addition of aqueous solutions of the salts of the doping metals (A) or of suspensions of the hydrated precursors of the oxides of the doping metals (B) to the Ti-containing solution or to the suspension of the finely disperse inorganic support material before during or after the precipitation, impregnation of the washed filter cake with A or kneading of the filter cake with B, impregnation of the calcined product or of the hydrothermally treated product with A or kneading of the two products with B, followed by renewed drying and calcining or hydrothermal treatment, or in the 2nd process variant (precipitation of a mixture of hydrated precursors of one or more metal oxides or semi-metal oxides and hydrated titanium oxide)

addition of aqueous solutions of the salts of the doping metals (A) or of suspensions of the hydrated precursors of the oxides of the doping metals (B) to the solutions of the metal or semi-metal salts for the support material and the Ti-containing solution before precipitation of the hydrated precursors of their oxides, simultaneous addition of A or B together with the solutions of the metal or semi-metal salts for the support material and the Ti-containing solution to the precipitation of the hydrated precursors of their oxides, addition of A or B to the suspension of the freshly precipitated hydrated precursors of the oxides of metals or semi-metals for the support material and of Ti (addition after the precipitation), impregnation of the washed filter cake of the freshly precipitated hydrated precursors of the oxides of metals and semi-metals for the support material and of Ti with A or kneading of the filter cake with B (2), impregnation of the calcined product or of the hydrothermally treated product from the oxides of metals and semi-metals for the support material and of Ti with A or kneading of the two products with B, followed by renewed drying and calcining or hydrothermal treatment.

The doped catalysts prepared according to the invention are stable at even higher temperatures than the doped catalysts prepared according to the prior art or, depending on the doping metal oxide, are also stable to high temperatures per se (up to 800° C.). Doped here is understood as meaning the presence of small amounts of oxides of metals other than the metal or semi-metal oxides which represent the support material. Contents of doping metal oxide of not more than 25 wt. %, preferably not more than 10 wt. %, based on the finished catalyst material or catalyst support material, are regarded here as small amounts. The distribution of the doping component in the catalyst material is not specified: The doping component can be distributed uniformly in the volume of the catalyst material, or can be concentrated on its internal surface, or can be present exclusively there.

The catalysts and catalyst supports prepared according to the invention are used, inter alia, in waste gas catalytic conversion (e.g. motor vehicles, combustion power stations), in chemical catalytic processes, in the petrochemicals industry and in organic base material synthesis.

The invention is explained in more detail in the following with the aid of examples.

COMPARISON EXAMPLE A

Preparation of a Catalyst Powder Comprising $TiO_2$ Without a Support (Prior Art)

A metatitanic acid prepared by the sulfate process and subsequently washed and bleached was dried overnight at 105° C. The pulverulent product obtained had the following properties: 80 wt. % $TiO_2$ content, 10 wt. % adhering $H_2SO_4$, remainder water bonded chemically and in pores, and the $TiO_2$ was in the anatase form to the extent of 100% (x-ray diffractogram). The BET surface area was 299 $m^2/g$. The crystallite size was 7 nm (determination by the Scherrer method). In each case 10 g of the product were calcined at 750, 800 and 850° C. in a muffle furnace for 4 hours, and the BET surface area, the ratio of anatase and rutile and the crystallite size were determined again. The results are summarized in table 1 and show the lack of stability of the specific surface area against sintering and the lack of stability of the anatase modification against conversion into rutile.

COMPARISON EXAMPLE B

Preparation of a Catalyst by Application of $TiO_2$ to a Pre-Produced Agglomerated $Al_2O_3$ Support (Prior Art)

2 l $H_2O$ and 100 g of a commercial aluminium oxide (theta-$Al_2O_3$, BET=99 to 100 $m^2/g$, agglomerate size $d_{50}$=28 μm, fine particle content 20%<10 μm (measured with laser diffraction)) were initially introduced, with stirring, into a 6 l round-bottomed flask with a KPG stirrer, reflux condenser, contact thermometer and heating mushroom. 675 ml $TiOSO_4$ solution, which contained 44.5 g Ti (which corresponds to an equivalent content of 110 g $TiO_2$/l) and was stabilized with 225 g $H_2SO_4$/l, were added uniformly at 90° C. over a period of 180 minutes. The mixture was then boiled for 30 minutes and subsequently filtered, washed and dried.

In each case 10 g of the product were calcined and analysed as in comparison example A. The results in table 1 show an even poorer heat stability of the anatase phase towards conversion into rutile than comparison example A.

EXAMPLE 1

Preparation of a Catalyst by Application of $TiO_2$ to a Pre-Produced Finely Disperse $Al_2O_3$ Support 2 l $H_2O$ and 100 g of a commercial aluminium oxide (CABOT ALON, pyrogenic and therefore non-agglomerated $Al_2O_3$ from Cabot, BET=52 to 55 $m^2/g$, average particle size 30 nm (measured with a transmission electron microscope (TEM)) were initially introduced, with stirring, into a 6 l round-bottomed flask with a KPG stirrer, reflux condenser, contact thermometer and heating mushroom. 675 l $TiOSO_4$ solution, which contained 44.5 g Ti (which corresponds to an equivalent content of 110 g $TiO_2$/l) and was stabilized with 225 g $H_2SO_4$/l, were added uniformly at 90° C. over a period of 180 minutes. The mixture was then boiled for 30 minutes and subsequently filtered, washed and dried.

In each case 10 g of the product were calcined at 750, 800 and 850° C. in a muffle furnace for 4 hours and analysed. The results in tab. 1 show, like those from comparison example B, a sufficiently high and heat-stable specific surface area but, in contrast to the results from comparison example B, the stability of the anatase phase towards conversion into rutile.

EXAMPLE 2

Preparation of a Catalyst by Application of $TiO_2$ to a Pre-Produced Finely Disperse $SiO_2$ Support 2 l $H_2O$ and 100 g of a commercial silicon dioxide (Aerosil OX50 (pyrogenic and therefore non-agglomerated silica from Degussa), BET=45 $m^2/g$, average particle size 40 nm (measured with a TEM)) were initially introduced, with stirring, into a 6 l round-bottomed flask with a KPG stirrer, reflux condenser, contact thermometer and heating mushroom. 675 ml $TiOSO_4$ solution, which contained 44.5 g Ti (which corresponds to an equivalent content of 110 g $TiO_2$/l) and was stabilized with 225 g $H_2SO_4$/l, were added uniformly at 90° C. over a period of 180 minutes. The mixture was then boiled for 30 minutes and subsequently filtered, washed and dried.

In each case 10 g of the product were calcined and analysed analogously to example 1. The results in tab. 1 also show here a heat-stable and sufficiently high specific surface area and the stability of the anatase phase towards conversion into rutile.

EXAMPLE 3

Preparation of a Catalyst by Application of $TiO_2$ to a Pre-Produced, Particularly Finely Disperse $SiO_2$, Support The preparation and testing of the catalyst were carried out analogously to example 2, a commercial, particularly finely divided silicon dioxide (Aerosil 200 (pyrogenic and therefore non-agglomerated silica from Degussa), BET=200±25 $m^2/g$, average particle size 12 nm (measured with a TEM)) being employed as the support. In this case, only 50 g of the silica were employed, and 900 ml of the $TiOSO_4$ solution already used in example 2 were added dropwise over a period of 240 minutes. Corresponding to the larger specific surface area of the support compared with example 2, a $TiO_2$ layer just as uniform and just as thick as in example 2 was thus obtained. The results are shown in table 1.

Examples 1 to 3 show that by means of the process according to the invention and using pre-produced finely divided support materials, $TiO_2$-containing catalysts which are stable to high temperatures in respect of their specific surface area and in respect of the anatase content of the $TiO_2$ can be prepared.

EXAMPLE 4

Preparation of a Catalyst Via Precipitation of a Mixture of Precursors of $TiO_2$ and $Al_2O_3$ 5 l water were initially introduced at room temperature into a 74 l high-grade steel pipe with a heating coil, stirrer and drain valve. 15.495 l $NaAlO_2$ solution having an Al content equivalent to 305 g $Al_2O_3$/l and 15.700 l $TiOSO_4$ solution having a Ti content equivalent to 110 g $TiO_2$/l were added to this simultaneously in the course of 180 minutes using hose pumps. During this procedure, the pH was kept at 6±1 by addition of approx. 1 l 50% strength $H_2SO_4$. The temperature rose to 60° C. due to the heat of reaction. The mixture was then matured for one hour, while stirring and heating at 80° C. Thereafter, the mixture had a content of precursors, calculated as the oxides $TiO_2$ and $Al_2O_3$, of 171 g/l.

The mixture was then filtered with suction and the residue was washed with 13 l of hot water (temperature 60° C.) and 13 l of hot (60° C.) $(NH_4)_2SO_4$ solution having a content of 315 g/l. The filter cake was dried for 12 hours at 110° C. and calcined at 800° C. for 4 hours in a rotated quartz glass bulb with gas suction, which was in a chamber oven. The product obtained was then analysed in respect of specific surface area, rutile content and anatase crystallite size analogously to the previous examples. The results are shown in table 1. The product contained 3,200 to 3,600 ppm Na.

EXAMPLE 5

Preparation of a Catalyst by Precipitation of a Mixture of Precursors of $TiO_2$ and $Al_2O_3$ Analogously to example 4, 15.495 l $NaAlO_2$ solution were initially introduced into a 74 l high-grade steel pipe with a heating coil, stirrer and drain valve and were brought to a pH of 6±1 by addition of approx. 9.5 l 50% strength $H_2SO_4$ in the course of 90 minutes. During this procedure, the temperature rose to 95° C. The mixture was matured for 1 hour, while stirring and heating at 80° C. 15.700 l $TiOSO_4$ solution having a Ti content equivalent to 110 g $TiO_2$/l were then added via a hose pump in the course of 90 minutes, the pH being maintained with approx. 27 l 10% strength aqueous $NH_3$ solution. The mixture was matured for 1 hour, while stirring and heating at 80° C. The mixture now had a content of solids, calculated as oxides, of 96 g/l. Thereafter, it was filtered with suction and the further procedure was analogous to example 4. After calcining at 800° C. for 4 hours, a further calcining was carried out at 900° C. for 11 hours and another calcining at 900° C. for 13 hours. The results are shown in table 1. The product contained 3,000 to 3,200 ppm Na.

EXAMPLE 6

Preparation of a Catalyst by Precipitation of a Mixture of Precursors of $TiO_2$ and $SiO_2$ 5 l $H_2O$ were initially introduced into a 74 l high-grade steel pipe with a heating coil, stirrer and drain valve. 13.525 l $Na_2SiO_3$ solution having an Si content corresponding to 345 g $SiO_2$/l and 20.655 l $TiOSO_4$ solution having a Ti content equivalent to 110 g $TiO_2$/l were added simultaneously over a period of 180 minutes via hose pumps. During this procedure, the pH was kept at 5 to 6 by addition of approx. 29 l 10% strength aqueous $NH_3$ solution. The temperature rose to 40° C. due to the heat of reaction. The mixture was matured for 1 hour, while stirring and heating at 80° C. The mixture now had a content of solids, calculated as oxides, of 101 g/l. Thereafter, it was filtered with suction and washed with 14 l of hot water and 14 l of hot $(NH_4)_2SO_4$ solution (concentration 84 g/l). The filter cake was dried at 110° C. and treated analogously to example 5. The results are shown in table 1. The product contained 600 to 700 ppm Na.

EXAMPLE 7

Preparation of a Catalyst by Precipitation of a Mixture of Precursors of $TiO_2$ and $SiO_2$ Analogously to example 6, 15 l of hot water at 90° C. were initially introduced into a 74 l high-grade steel pipe with a heating coil, stirrer and drain valve. 12.525 l $Na_2SiO_3$ solution having an Si content corresponding to 345 g $SiO_2$/l were added over a period of 120 minutes via a hose pump. During this procedure, the pH was kept at 7 to 8 by addition of approx. 3.5 l 50% strength $H_2SO_4$. The mixture was matured for half an hour, while stirring and heating at 80° C. 20.655 l $TiOSO_4$ solution having a Ti content equivalent to 110 g $TiO_2$/l were then added via a hose pump in the course of 90 minutes, while heating at 80° C., and the mixture was matured for 1 hour, while stirring and heating at 80° C. The mixture now had a content of solids, calculated as oxides, of 133 g/l. Thereafter, it was filtered with suction and the further procedure was analogous to example 6. The results are shown in table 1. The product contained <50 ppm Na.

Examples 4 to 7 show, in comparison with comparison examples A and B, that $TiO_2$ products which are suitable for use as high-temperature catalysts and in which the $TiO_2$ content can be established as pure anatase or as an anatase-rutile mixture can be produced by precipitation reactions.

EXAMPLE 8

Preparation of Catalysts by Hydrothermal Treatment

Washed filter cakes of the mixtures of precursors of $TiO_2$ and $Al_2O_3$ or $SiO_2$ produced in-house, corresponding to examples 5 and 6, in each case in an amount corresponding to 100 g of solid, were treated with in each case 800 ml of completely desalinated water in a 2 l steel autoclave at 180° C. under 10 bar for periods of in each case 2, 4 and 6 hours and were then filtered off, washed and dried. Analysis of the products showed that their properties scarcely changed from 2 to 4 hours, and thereafter no longer changed. The results after 6 hours of hydrothermal treatment are shown in table 2. It can be seen that catalyst properties which are close to those of the calcined catalysts described above can be achieved with a hydrothermal treatment. This means that, where appropriate, calcining at the end of the preparation of the catalyst can be dispensed with and the adjustment of the final properties of the catalyst can be carried out in the run-in phase of the high-temperature catalyst.

EXAMPLE 9

Preparation of Doped Catalysts by Precipitation of Mixtures of Precursors of $TiO_2$ and $Al_2O_3$ or $SiO_2$ and subsequent impregnation Analogously to examples 5 and 6, $TiO_2$—$Al_2O_3$ and $TiO_2$—$SiO_2$ mixtures were prepared by precipitation. After the precipitation, aqueous solutions of $SnSO_4$, $Ce(SO_4)_2$, $MnSO_4$, $(NH_4)_2Fe(SO_4)_2$ or $NiSO_4$ in an amount in each case corresponding to 0.5 mmol of metal per 9 of solid in the particular filter cake were stirred into the washed, still wet filter cake.

The doping amounts were calculated such that at a catalytically active surface area of 100 $m^2$/g of sample at the start of the last stage of the calcining, each $m^2$ of surface area should be covered with 5 μmol of doping element; on complete diffusing in, a volume doping of the $TiO_2$ of 12 to 15 mol % would result.

After drying, calcining was carried out for in each case 4 hours at 800° C. in a muffle furnace. The results are shown in part in table 3. The specific surface area was lowered by the doping only a little in the $TiO_2$—$Al_2O_3$ mixture, and by up to ¼ in the $TiO_2$—$SiO_2$ mixture. The pore volume, the distribution of the specific surface area among meso- and micropores and the pore diameter distribution were not influenced by the doping. On the other hand, as expected doping with Sn compounds promoted the conversion of the anatase modification into rutile during calcining.

It can also be seen from table 3 that the heat stability of the products prepared according to the invention from $TiO_2$ and $Al_2O_3$ or $SiO_2$ in respect of specific surface area and anatase modification is not substantially impaired by the doping by the simple impregnation process.

COMPARISON EXAMPLE C

Preparation of a Catalyst Powder from $TiO_2$, Doped with $WO_3$ (Prior Art)

1 l of a suspension of 300 g/l of a metatitanic acid, prepared by the sulfate process and then washed and bleached, in water was initially introduced into a stirred container with a heating coil and was heated to 95° C., while stirring. 0.70 l of a solution of ammonium metatungstate $(NH_4)_6H_2W_{12}O_{40}$ having a content of 50 g/l was added in the course of 10 minutes. The mixture was then boiled for 2 hours. The suspension was then dried at 110° C., without prior filtration, and calcined at 600° C. for 2 h. The material contained 9.3% $WO_3$. The further results are shown in table 4.

EXAMPLE 10

Preparation of a $WO_3$-Doped Catalyst Powder by Precipitation of a Mixture of Precursors of $TiO_2$, $SiO_2$ and $WO_3$ As in example 6, a mixture of precursors of $TiO_2$ and $SiO_2$ was precipitated. After the maturing phase and before the filtration with suction, 3.930 l of a solution of $Na_2WO_4.2H_2O$ having a content of 165 g/l were added in the course of 1 h at 90° C. During this procedure, the pH was kept at 2 by means of 50% strength $H_2SO_4$; the mixture was then matured for 2 hours at 90° C., while stirring. Thereafter, the suspension was filtered and washed analogously to example 6. The washed filter cake was predried for 4 days at 50° C. and finally dried for 8 hours at 110° C. Deviating from example 6, calcining was carried out at 600° C. for 2 hours and then at 700 and 800° C. for 2.5 hours. According to chemical analysis, the catalyst material obtained comprised $TiO_2$ to the extent of 32%, $SiO_2$ to the extent of 58% and $WO_3$ to the extent of 5.4%, the Na content being 0.33%. The further results are shown in tab. 4. It can be seen that the specific surface area and porosity at 600° C. are significantly greater compared with comparison example C and, in contrast to comparison example C, are also still stable above 750° C.

TABLE 1

Comparison of the catalysts according to comparison examples A and B and examples 1 to 7 according to the invention

| Example | Temperature during calcining for 4 hours in ° C. | BET [m²/g] | Pore volume [cm³/g] | Average pore diameter [nm] | % content of rutile in the $TiO_2$ | Anatase: Scherrer crystallite size [nm] |
|---|---|---|---|---|---|---|
| A: $TiO_2$ without support | dried before calcining | 299 | | | 0 | 7 |
| A: $TiO_2$ without support | 750 | 28 | | | 0 | 33 |
| A: $TiO_2$ without support | 800 | 17 | | | 0.9 | 44 |
| A: $TiO_2$ without support | 850 | 9.5 | | | 1.4 | 62 |
| B: $TiO_2$ on pre-produced agglomerated support ($Al_2O_3$) | dried before calcining | 174 | | | 0 | 8 |
| B: $TiO_2$ on pre-produced agglomerated support ($Al_2O_3$) | 750 | 66 | | | 0 | 23 |
| B: $TiO_2$ on pre-produced agglomerated support ($Al_2O_3$) | 800 | 59 | 0.23 | 15–20 | approx. 1.5 | 26 |
| B: $TiO_2$ on pre-produced agglomerated support ($Al_2O_3$) | 850 | 55 | | | 21 | 29 |
| 1: $TiO_2$ on pre-produced finely disperse support ($Al_2O_3$) | dried before calcining | 121 | | | 0 | 12 |
| 1: $TiO_2$ on pre-produced finely disperse support ($Al_2O_3$) | 750 | 49 | | | 0 | 18 |
| 1: $TiO_2$ on pre-produced finely disperse support ($Al_2O_3$) | 800 | 45 | | | 0 | 20 |

TABLE 1-continued

Comparison of the catalysts according to
comparison examples A and B and examples 1 to 7
according to the invention

| Example | Temperature during calcining for 4 hours in ° C. | BET [m²/g] | Pore volume [cm³/g] | Average pore diameter [nm] | % content of rutile in the TiO₂ | Anatase: Scherrer crystallite size [nm] |
|---|---|---|---|---|---|---|
| 1: TiO₂ on pre-produced finely disperse support (Al₂O₃) | 850 | 42 | | | 0 | 22 |
| 2: TiO₂ on pre-produced finely disperse SiO₂ | dried before calcining | 119 | | | | |
| 2: TiO₂ on pre-produced finely disperse SiO₂ | 750 | 42 | | | 3 | 30 |
| 2: TiO₂ on pre-produced finely disperse SiO₂ | 800 | 40 | 0.34 | — | 3 | 32 |
| 2: TiO₂ on pre-produced finely disperse SiO₂ | 850 | 40 | | | 3 | 34 |
| 3: TiO₂ on pre-produced particularly finely disperse SiO₂ | dried before calcining | 157 | | | | |
| 3: TiO₂ on pre-produced particularly finely disperse SiO₂ | 750 | 79 | | | 0 | 29 |
| 3: TiO₂ on pre-produced particularly finely disperse SiO₂ | 800 | 78 | | | 0 | 30 |
| 3: TiO₂ on pre-produced particularly finely disperse SiO₂ | 850 | 77 | | | 0 | 31 |
| 4: TiO₂—Al₂O₃ mixture from precipitation of precursors | 800 | 69–72 | 0.16–0.24 | 4–12 | 0–1 | 22–27 |
| 5: TiO₂—Al₂O₃ mixture from precipitation of precursors | 800 | 61–73 | 0.16–0.27 | 4–12 | 0 | 22–28 |
| 5: TiO₂—Al₂O₃ mixture from precipitation of precursors | after a further 11 h at 900° C. | 38 | | | 0–2 | |
| 5: TiO₂—Al₂O₃ mixture from precipitation of precursors | after an additional 13 h at 900° C. | 31 | | 0.11–0.13 | 0–2 | |
| 6: TiO₂—SiO₂ mixture from precipitation of precursors | 900 | 129–141 | 0.47–0.51 | 7–50 | 0 | 23 |

TABLE 1-continued

Comparison of the catalysts according to comparison examples A and B and examples 1 to 7 according to the invention

| Example | Temperature during calcining for 4 hours in ° C. | BET [m²/g] | Pore volume [cm³/g] | Average pore diameter [nm] | % content of rutile in the TiO₂ | Anatase: Scherrer crystallite size [nm] |
|---|---|---|---|---|---|---|
| 6: TiO₂—SiO₂ mixture from precipitation of precursors | after a further 11 h at 900° C. | 102 | | | 0 | |
| 6: TiO₂—SiO₂ mixture from precipitation of precursors | after an additional 13 h at 900° C. | 90 | | 0.23–0.29 | 0 | |
| 7: TiO₂—SiO₂ mixture from precipitation of precursors | 900 | 174–180 | 0.40–0.46 | | 58 | 28–31 (rutile: 72–75) |
| 7: TiO₂—SiO₂ mixture from precipitation of precursors | after a further 11 h at 800° C. | 175 | | | 61 | 36 (rutile 82) |
| 7: TiO₂—SiO₂ mixture from precipitation of precursors | after an additional 13 h at 800° C. | 171 | 0.32–0.36 0.36 | | 63 | 33 (rutile: 96) |

TABLE 2

Catalysts prepared by hydrothermal treatment according to example 8

| | BET [m²/g] | % content of rutile in the TiO₂ | Anatase: Scherrer crystallite size [nm] |
|---|---|---|---|
| TiO₂—Al₂O₃ mixture from precursors produced in-house analogously to example 5 | 115 | 0 | 14 |
| TiO₂—SiO₂ mixture from precursors produced in-house analogously to example 6 | 186 | 0 | 8 |

TABLE 3

Catalysts according to example 9, doped by impregnation

| | % content of rutile in the TiO₂ | Anatase: Scherrer crystallite size [nm] |
|---|---|---|
| TiO₂—Al₂O₃ mixture from precursors produced in-house analogously to example 5 | 0 | 22 |
| +SnSO₄ | 65 | 21 (rutile 35) |
| +Ce(SO₄)₂ | 0 | 18 |
| +MnSO₄ | 3 | 37 |
| +(NH₄)₂Fe(SO₄)₂ | 3 | 30 |
| +NiSO₄ | 0 | 32 |

TABLE 3-continued

Catalysts according to example 9, doped by impregnation

| | % content of rutile in the TiO₂ | Anatase: Scherrer crystallite size [nm] |
|---|---|---|
| TiO₂—SiO₂ mixture from precursors produced in-house analogously to example 6 | 0 | 23 |
| +SnSO₄ | 68 | 14 (rutile 9) |
| +Ce(SO)₄ | 0 | 19 |
| +MnSO₄ | 0 | 31 |
| +(NH₄)₂Fe(SO₄)₂ | 10 | 27 |
| +NiSO₄ | 0 | 24 |

TABLE 4

WO₃-doped catalysts according to comparison example C and example 10 according to the invention

| Example | Temperature during calcining for 2 hours in ° C. | BET [m²/g] | Pore volume [cm³/g] |
|---|---|---|---|
| C: TiO₂ without support | 600 | 64 | 0.25 |
| C: TiO₂ without support | after a further 2.5 h at 700° C. | 43 | 0.19 |
| C: TiO₂ without support | alternatively after a further 2.5 h at 800° C. | 25 | 0.10 |

TABLE 4-continued

WO$_3$-doped catalysts according to comparison
example C and example 10 according to the invention

| Example | Temperature during calcining for 2 hours in ° C. | BET [m$^2$/g] | Pore volume [cm$^3$/g] |
|---|---|---|---|
| 10: TiO$_2$—SiO$_2$ mixture from precipitation of precursors analogously to example 6 | 600 | 167 | 0.79 |
| 10: TiO$_2$—SiO$_2$ mixture from precipitation of precursors analogously to example 6 | after a further 2.5 h at 700° C. | 156 | 0.51 |
| 10: TiO$_2$—SiO$_2$ mixture from precipitation of precursors analogously to example 6 | alternatively after a further 2.5 h at 800° C. | 149 | 0.46 |

The invention claimed is:

1. A process for the preparation of a TiO$_2$-containing catalyst or catalyst support which is stable to high temperatures, comprising:
   adding an aqueous Ti-containing solution having dissolved Ti content equivalent to 10 to 250 g TiO$_2$ per liter of solution to an aqueous suspension of not more than 10 wt. % of a dispersed inorganic support material to form a product mixture;
   wherein the inorganic support material has a specific surface area, measured by the BET method, of >20 m$^2$/g and any agglomerates thereof have a particle size of d$_{50}$<10 µm;
   wherein the Ti-containing solution is added to said suspension at a rate such that not more than the equivalent of 0.05 g TiO$_2$ per m$^2$ of support surface an hour is added and the TiO$_2$ is precipitated as hydrated titanium oxide on the inorganic support,
   filtering the product mixture to form a filtered product;
   washing the filtered product to form a washed product; and
   calcining the washed product or introducing into an autoclave together with water and kept at temperature of >100° C. for a period of one hour to 5 days the washed product to yield the TiO$_2$-containing catalyst or catalyst support.

2. The process according to claim 1, wherein any agglomerates of the inorganic support material which are present have a particle size of d$_{so}$<5 µm.

3. The process according to claim 2, wherein the aqueous suspension comprises a dilute acid, a concentrated acid, or an alkali.

4. The process according to claim 2, wherein the washed product is introducing into an autoclave together with water and kept at temperature of >100° C. for a period of one hour to 5 days to yield the TiO$_2$-containing catalyst or catalyst support.

5. The process according to claim 1, wherein the aqueous suspension comprises a dilute acid, a concentrated acid, or an alkali.

6. The process according to claim 5, wherein the washed product is introducing into an autoclave together with water and kept at temperature of >100° C. for a period of one hour to 5 days to yield the TiO$_2$-containing catalyst or catalyst support.

7. The process according to claim 1, wherein the washed product is introducing into an autoclave together with water and kept at temperature of >100° C. for a period of one hour to 5 days to yield the TiO$_2$-containing catalyst or catalyst support.

8. The process according to claim 1, wherein said aqueous Ti-containing solution comprises titanyl sulfate or titanium sulfate.

9. The process according to claim 1, wherein the concentration of dissolved Ti in the Ti-containing solution is equivalent to 10 to 200 g TiO$_2$ per liter of solution.

10. The process according to claim 9, wherein the concentration of dissolved Ti in the Ti-containing solution is equivalent to 50 to 180 g TiO$_2$ per liter of solution.

11. The process according to claim 10, wherein the washed product precipitation mixture is introduced into an autoclave together with water and kept at temperatures of >100° C. for a period of one hour to 5 days.

12. The process according to claim 1, wherein the concentration of inorganic support material in the suspension of the finely disperse support material is 0.2 to 8 wt. %.

13. The process according to claim 12, wherein the concentration of inorganic support material in the suspension of the finely disperse support material is 0.5 to 5 wt. %.

14. The method of claim 1, wherein the inorganic support material comprises aluminum oxide.

15. The method of claim 1, wherein the inorganic support material comprises silicon dioxide.

16. A process for the preparation of a TiO$_2$-containing catalyst or catalyst support which is stable to high temperatures, comprising: adding an aqueous Ti-containing solution having a concentration dissolved Ti equivalent to 10 to 250 g TiO$_2$ per liter of solution to an aqueous suspension of not more than 10 wt. % of a dispersed inorganic support material wherein the inorganic support material has a specific surface area, measured by the BET method, of >20 m$^2$/g and any agglomerates thereof have a particle size of d$_{50}$<10 µm; wherein the Ti-containing solution is added to said suspension at a rate such that not more than the equivalent of 0.05 g TiO$_2$ per m$^2$ of support surface an hour is added and the TiO$_2$ is precipitated as hydrated titanium oxide on the inorganic support, introducing hydrated titanium oxide on the inorganic support the into an autoclave together with water and at temperature of >100° C. for a time period of one hour to 5 days to form an autoclaved product;
   filtering the product; and
   washing the filtered autoclaved product to form a filtered product.

17. The method of claim 16, wherein the inorganic support material comprises aluminum oxide.

18. The method of claim 16, wherein the inorganic support material comprises silicon dioxide.

* * * * *